United States Patent
Fuessel et al.

(10) Patent No.: US 7,162,962 B2
(45) Date of Patent: Jan. 16, 2007

(54) PNEUMATIC DISTRIBUTION SYSTEM FOR AIR SEEDERS

(75) Inventors: Jason M. Fuessel, Yorkton (CA); John A. Lesanko, Sturgis (CA)

(73) Assignee: Morris Industries Ltd., Yorkton (CA)

( * ) Notice: Subject to any disclaimer, the term of this patent is extended or adjusted under 35 U.S.C. 154(b) by 0 days.

(21) Appl. No.: 11/040,070

(22) Filed: Jan. 21, 2005

(65) Prior Publication Data

US 2006/0162630 A1  Jul. 27, 2006

(51) Int. Cl.
*A01C 7/00* (2006.01)
*A01C 9/00* (2006.01)

(52) U.S. Cl. .................................... 111/176; 138/44

(58) Field of Classification Search ............. 111/176, 111/174; 138/44, 40
See application file for complete search history.

(56) References Cited

U.S. PATENT DOCUMENTS

| | | | |
|---|---|---|---|
| 3,490,654 A * | 1/1970 | Fischer ..................... 406/123 |
| 3,848,772 A * | 11/1974 | Aanenstad et al. ......... 222/617 |
| 4,650,093 A * | 3/1987 | Meyer-Bosse .............. 221/233 |
| 5,272,992 A | 12/1993 | Barbour et al. |
| 5,700,111 A * | 12/1997 | Johnson et al. .......... 405/302.7 |
| 5,979,343 A | 11/1999 | Gregor et al. |
| 5,996,516 A | 12/1999 | Benneweis et al. |
| 6,158,333 A | 12/2000 | Honkalampi et al. |
| 6,192,813 B1 | 2/2001 | Memory et al. |
| 6,283,679 B1 * | 9/2001 | Gregor et al. ................ 406/26 |
| 6,296,425 B1 | 10/2001 | Memory et al. |
| 6,298,797 B1 * | 10/2001 | Mayerle et al. ............ 111/175 |
| 6,644,225 B1 | 11/2003 | Keaton |

OTHER PUBLICATIONS

Morris "Concept 2000 Air Seeding and Tillage System" Brochure (23 pgs).
Morris "Maxim II Air Drill System" Brochure (#0007-01) (24 pgs).
Morris "Never Pin Disc Air Drill" Brochure Brochure (#00025-02) (Front and Back).

* cited by examiner

*Primary Examiner*—Christopher J. Novosad
(74) *Attorney, Agent, or Firm*—Hovey Williams LLP

(57) ABSTRACT

The primary distribution hoses on the tillage implement of a pneumatic seeding machine are of different lengths as needed to reach distribution heads or splitters on the implement that further divide the primary streams of materials into individual streams leading directly to the ground-engaging openers of the implement. Notwithstanding the differential in hose length, outlet pressures at the distribution heads are made uniform through the provision of internal flow restrictors associated with those hoses that are shorter than the longest hoses on the machine. Throat diameters of the restrictors vary in accordance with the pressure drop that is needed to match the difference in hose length between the longest hose and the restricted hose. In a preferred embodiment, the restrictors are mounted within nipples on the coupling assembly that releasably connects conduits from a seed cart with the primary hoses on the implement.

15 Claims, 4 Drawing Sheets

PNEUMATIC DISTRIBUTION SYSTEM FOR AIR SEEDERS

TECHNICAL FIELD

The present invention relates to pneumatic seeding machines typically referred to as "air seeders" and, more particularly, to a way of achieving uniform delivery of seeds to all destination points on the machine, notwithstanding the fact that such points are located at a variety of different distances from the common source of airflow.

BACKGROUND AND SUMMARY

As air flows through a duct, such as a tube or hose, it loses kinetic energy, in the form of pressure, due to friction. Such pressure drop is a function of a number of different factors, including the shape and size of the duct and its length.

In an air seeder utilizing a pneumatic conveyance system, the success of the system is dependent upon maintaining an adequate amount of airflow throughout the system to keep the seeds in suspension within the air stream. If the airflow is insufficient, the product will fall from the stream and begin to build up on the bottom of the tube or hose. If the condition persists, the airflow within the tube or hose will be reduced to zero, and the build up of seeds will eventually cause plugging.

Typically, all hoses on an air seeder are supplied by a common air source and the flow is split equally among the various hoses, which are of the same size and shape. However, the sufficiency of the airflow can be an issue if the hoses vary in length, in order to reach openers on the machine that are unequally spaced from the air source. The different pressure drops caused by differences in hose length may result in plugging or uneven distribution of the seeds among the openers.

One way of keeping the pressure drop uniform throughout all hoses is to equalize their lengths. However, this means that hoses which deliver to locations closer to the source than others will necessarily have surplus lengths that are not needed, except for pressure uniformity purposes. This surplus hosing increases costs, stretches out set up and assembly time, wastes space, and looks cluttered and unattractive.

The present invention allows all the hoses to be as long or as short as necessary to reach their particular locations on the machine, without causing different pressure drops due to the different lengths. Internal airflow restrictors are utilized in the shorter hoses to create pressure drops to match those of the longer hose lengths. Different size restrictors are utilized in different hoses, depending upon the amount of pressure drop required to establish uniformity throughout all hoses.

In a preferred embodiment of the invention, the necessary flow restrictors are incorporated into a coupling assembly which detachably joins hoses from the seed reservoir cart with primary hoses on the seeding implement itself. Nipples on the coupling assembly may be fitted internally with appropriately dimensioned restrictors so that the restrictors are essentially hidden from view and require minimal maintenance.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
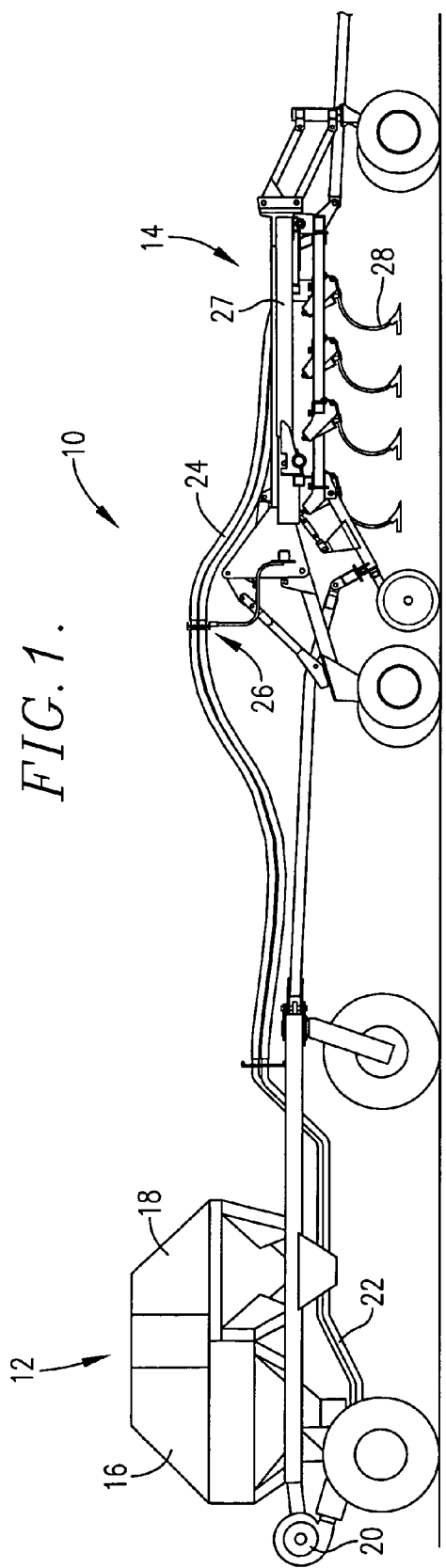
FIG. 1 is a fragmentary side elevational of a seeding machine incorporating the principles of the present invention.

The seeding machine 10 shown in FIG. 1 includes a mobile cart 12 containing a supply of seeds and/or fertilizer, and a planting implement 14 which is supplied seeds by cart 12. Cart 12 and implement 14 are adapted to be towed by a tractor (not shown) so that the seeds and/or fertilizer may be deposited into the ground as the machine is advanced across the field by the tractor. Although the implement 14 has been illustrated in a leading relationship with the cart 12, the order of appearance could be reversed with the cart being connected directly to the tractor and the implement 14 being towed by the cart.

As is typical, cart 12 includes one or more reservoirs 16 and 18 as well as a blower 20 that provides a known volumetric flow rate of air at a constant pressure. The volumetric airflow from blower 20 is divided equally across a number of conduits 22 that pass beneath reservoirs 16, 18 and receive metered supplies of materials therefrom. Conduits 22 may comprise pipes or hoses, or a combination of both. In the illustrated embodiment, adjacent the front of cart 12 the conduits 22 take the form of a number of flexible hoses that interface with primary supply hoses 24 on implement 14 at one or more coupling assemblies 26 (also known as "break-aways") adjacent the rear of implement 14. Broadly speaking, the conduits 22 and the primary hoses 24 collectively comprise structure defining tubular airflow passages for delivering seeds entrained within airstreams to predetermined destinations on the implement 14. As noted below, the lengths of some of such passages are shorter than others.

As is conventional, implement 14 includes a mobile frame 27 that carries a number of ground engaging tools 28 for opening furrows in the soil and depositing seeds into such furrows as the machine advances. The primary hoses 24 of implement 14 supply the seeds to distribution devices 30 on frame 27 (FIG. 3) which split up the flow of seeds into a number of separate streams and deliver them via smaller secondary tubes (not shown) to the individual tools 28. Distribution devices 30 may take the form of horizontal, flat fan dividers as described in U.S. Pat. No. 4,717,289 owned by the assignee of the present invention and hereby incorporated by reference into the present specification. Alternatively, the distribution devices 30 may take avariety of other forms in common use in the industry.

Figure 3:
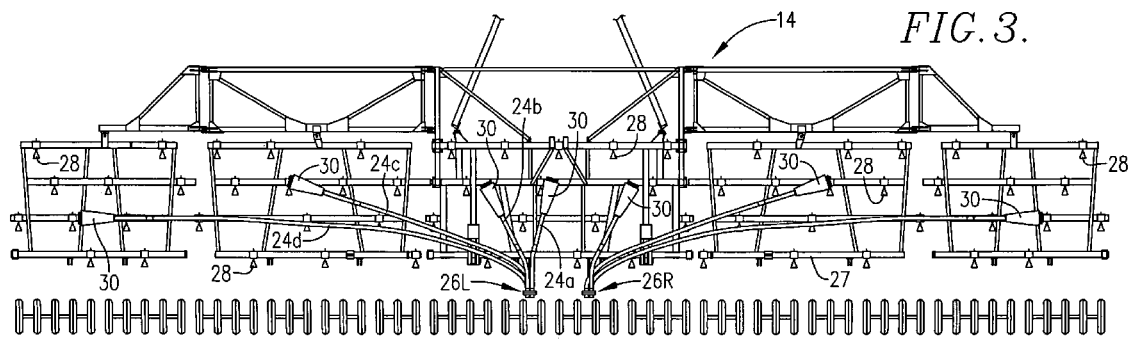
FIG. 3 is a fragmentary, schematic top plan view of a machine in accordance with the present invention employing different hose lengths and airflow restrictors as appropriate to achieve equal hose pressures.

In the illustrated embodiment, a pair of coupling assemblies 26 are provided on the implement 14 as shown in FIG. 3. The left coupling assembly in this figure has been designated 26L, while the right coupling assembly has been designated as 26R. In the description which follows, only the left coupling assembly 26L will be explained in detail, with the understanding that the right coupling assembly is similarly constructed.

Figure 4:
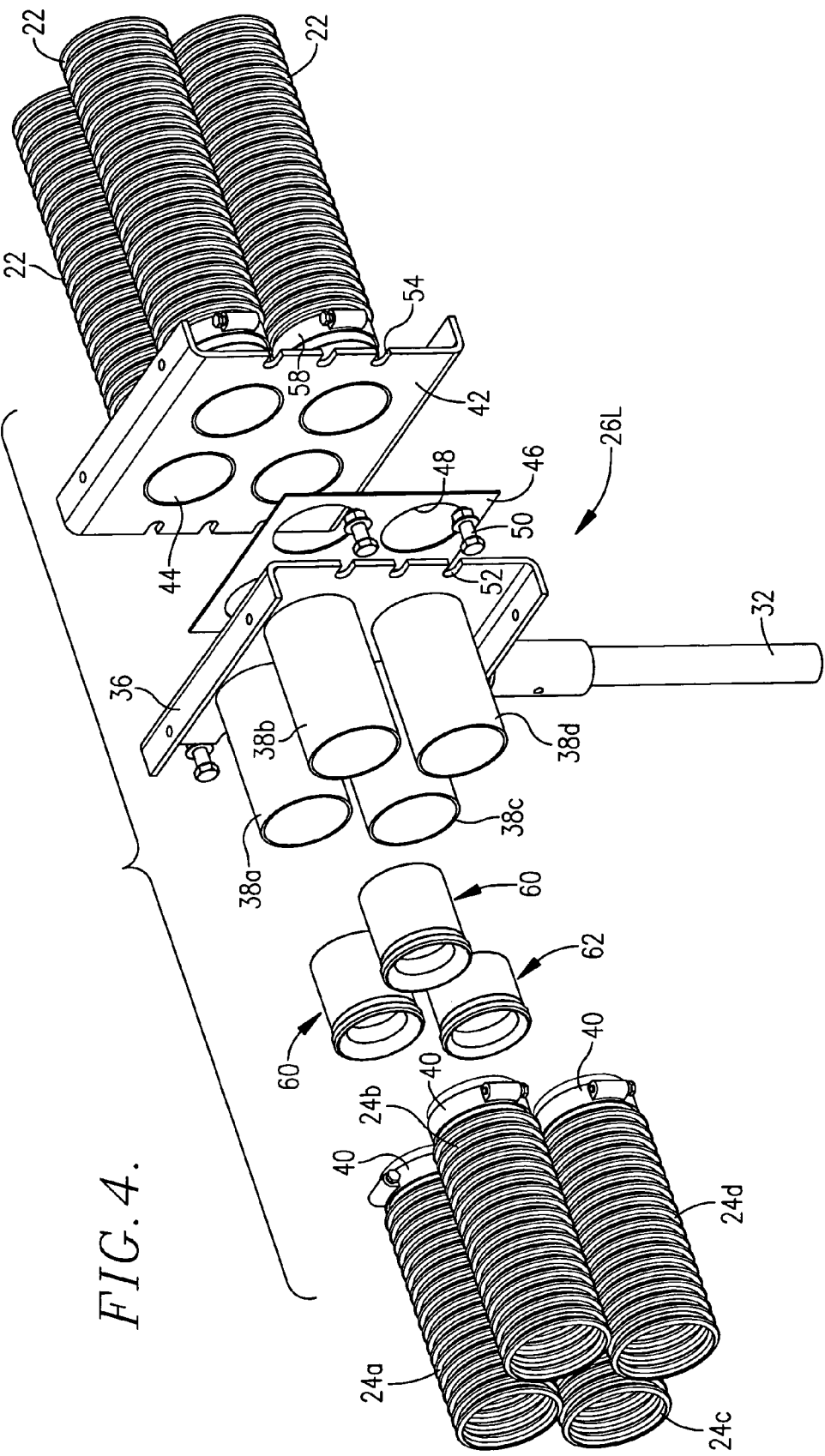
FIG. 4 is an enlarged, exploded isometric view of the coupling assembly between the seed reservoir cart and the planting implement illustrating the manner in which restrictors in accordance with the present invention may be incorporated into the coupling assembly.
Figure 6:
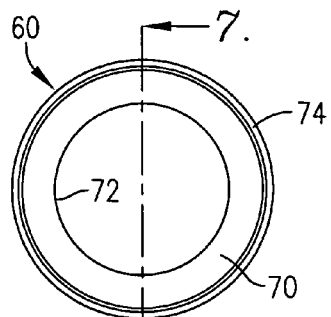
FIG. 6 is an enlarged, end elevational view of one of the restrictors installed within a hose nipple of the coupling assembly.

As illustrated in FIG. 3, there are four distribution devices 30 that serve the tools 28 on the left side of implement 14. Correspondingly, four primary supply hoses 24a, 24b, 24c, and 24d deliver seeds to the four devices 30. These four primary supply hoses are also illustrated in FIG. 4. Hoses 24a and 24b are the shortest hoses in the group, such as 2' long, while hose 24c is of intermediate length, such as 12' long, and hose 24d is the longest, such as 22' long. Notwithstanding the different length of the hoses 24a–24d, in accordance with the present invention the outlet pressures at the four distributing heads 30 are all substantially equal to one another.

Figure 5:
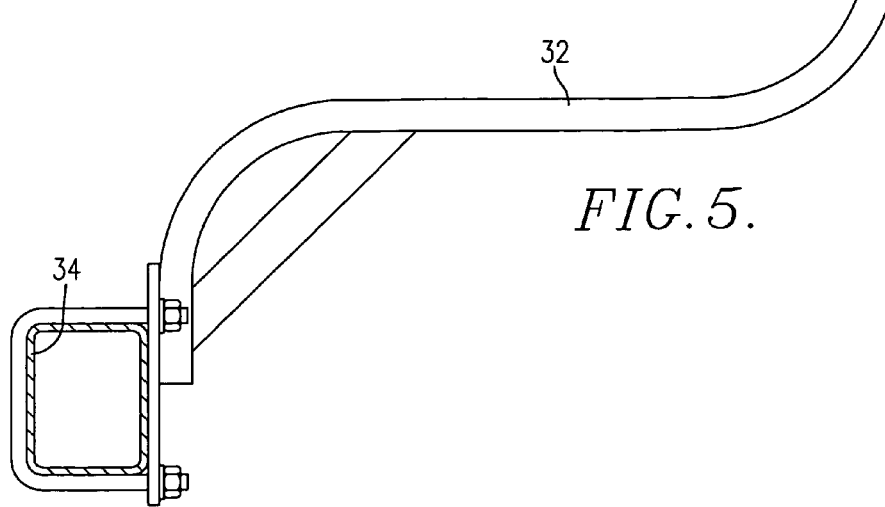
FIG. 5 is a side elevational view of the coupling assembly on a more reduced scale than FIG. 4 and illustrating the restrictors installed within hose nipples of the coupling assembly.

As illustrated in FIG. 4, and also FIG. 5, coupling assembly 26L comprises a support including a generally L-shaped, upright stand 32 that is clamped at its lower end to a beam 34 associated with frame 27. The support further includes an upright mounting plate 36 affixed to the upper end of stand 32 and having four horizontally disposed hose nipples 38a, 38b, 38c and 38d projecting forwardly therefrom. It will be understood that nipples 38a–38d are aligned with corresponding holes (not shown) in plate 36 so that streams of air, seeds and fertilizer can pass through plate 36 and nipples 38a–38d from the conduits 22 associated with supply cart 12. Hoses 24a–24d slip onto the outside of and receive corresponding nipples 38a-38d. Hose clamps 40 or other suitable means may be used to secure hoses 24a–24d onto nipples 38a-38d.

Coupling assembly 26L further includes a second upright mounting plate 42, although plate 42 is not fixed to stand 32. Like plate 36, plate 42 has four holes 44 therein adapted to be aligned with corresponding holes in plate 36 and with nipples 38a–38d when plate 42 is secured up against plate 36 as illustrated in FIG. 5. A gasket 46 having holes 48 aligned with holes 44 in plate 42 and those in plate 36 may be sandwiched between plates 36 and 42. Releasable bolts 50 fitting within notches 52 and 54 in the side edges of plates 36 and 42 respectively maybe used to releasably secure plate 42 up against plate 36.

Conduits 22 associated with cart 12 are secured to nipples 56 (FIG. 5) projecting from the backside of plate 42 in alignment with holes 44. Hose clamps 58 retain conduits 22 on nipples 56. As a result of their attachment to common mounting plate 42, conduits 22 may be quickly and easily detached from implement 14 by simply releasing bolts 50 from plates 36, 42 when cart 12 is to be uncoupled from implement 14.

In the illustrated embodiment, hose 24d is the longest of the four hoses. Thus, it will experience the most pressure drop. To equalize the pressure drop in all four of the hoses, hoses 24a, 24b and 24c are each provided with a restrictor capable of causing a pressure drop that matches the drop which would be produced by the length of surplus hose that must theoretically be added to each hose 24a, 24b, and 24c to make them the same length as hose 24d. Thus, if hose 24d is 22' long and hose 24c is 12' long, a restrictor capable of creating a pressure drop that matches the drop in a ten-foot length of hose is necessary for hose 24c. Similarly, if the hoses 24a and 24b are each 2' long, a restrictor is necessary for each of those hoses that is capable of creating a pressure drop matching the drop in a twenty-foot length of hose. Accordingly, the two short hoses 24a and 24b are each provided with the most restrictive restrictor 60, the longer hose 24c is provided with a restrictor 62 having less restrictive dimensions, and the longest hose 24d is provided with no restrictor at all.

Using the restrictor 62 as an example, it will be seen that each restrictor comprises an annular, generally cylindrical body 64 having an internal passage 66 therethrough. Passage 66 has an inlet 68 at the upstream end of body 64, an outlet 70 at the downstream end of body 64, and a central throat 72 located between inlet 68 and outlet 70. Throat 72 has a constant internal diameter, while inlet 68 tapers down from a maximum internal diameter at the upstream end of body 64 to a minimum internal diameter at its intersection with throat 72. On the other hand, outlet 70 has an internal diameter that progressively expands as the downstream end of body 64 is approached. Inlet 68 only gradually tapers toward throat 72 while, on the other hand, outlet 70 abruptly expands as the downstream end of body 64 is approached. Thus, the rate of expansion of outlet 70 is considerably higher than the rate of convergence of inlet 68. It has been found that a 10° taper for the internal sidewall of inlet 68 works well. In contrast, a 45° taper for the internal sidewall of outlet 70 is preferred.

Body 64 is provided with a continuous, circumferentially extending, enlarged lip 74 at the downstream end of body 64. Immediately adjacent lip 74 is a continuous external collar 76 having an outside diameter that is slightly less than that of lip 74 but is greater than that of the remaining, reduced diameter portion 78 of body 64. In a preferred embodiment, the restrictors are constructed from a synthetic resinous material.

It is contemplated that all restrictors associated with a machine will be of the same external dimensions, except for differences in length. Internally, the restrictors will be provided with different diameter throats 72 to afford greater or lesser restriction as the case may be, but the rate of convergence of the tapered inlet 68 will be the same in all cases, as will the rate of expansion of the outlet 70. Accordingly, the lengths of the inlets 62 and outlets 70 will vary in accordance with different diameter throats 72, as well as the overall length dimensions of the bodies. Thus, as will be noted comparing the restrictor 60 with the restrictor 62, the diameter of throat 72 is smaller for restrictor 60 than restrictor 62. This results in a longer inlet 68 and outlet 70 for restrictor 60 than for restrictor 62. And, the overall length of restrictor 60 is greater than that of restrictor 62.

Figure 7:
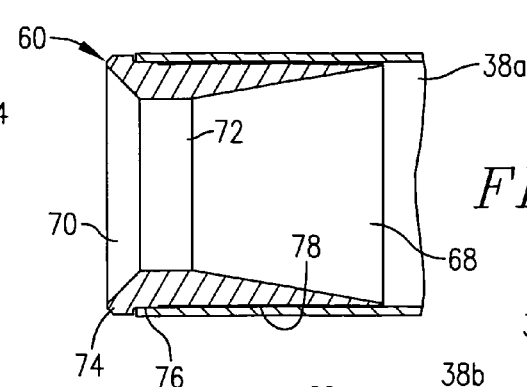
FIG. 7 is a fragmentary cross-sectional view thereof taken substantially along line 7—7 of FIG. 6.
Figure 8:
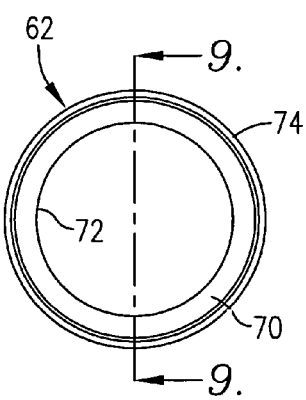
FIG. 8 is an end elevational view of another restrictor having a larger internal throat diameter than the restrictor of FIGS. 6 and 7.
Figure 9:
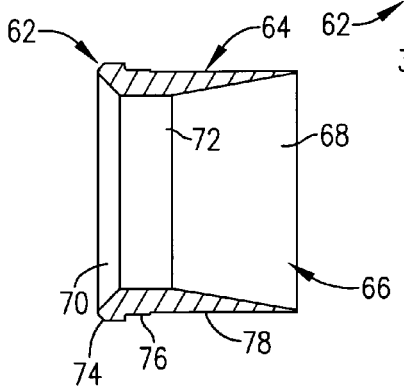
FIG. 9 is a cross-sectional view of the restrictor of FIG. 8 taken substantially along line 9—9 of that figure.

As noted in FIG. 7, the restrictors are received within the nipples 38. Preferably, the reduced diameter portion 78 of each restrictor has an outside diameter that is the same as or slightly less than the internal diameter of the nipple. On the other hand, the outside diameter of collar 76 is slightly greater than the inside diameter of nipple 38 such that the restrictor can be forced into the nipple and retained by a press fit between collar 76 and the inside surface of the nipple. Lip 74 has a greater outside diameter than the inside diameter of the nipple such that lip 74 serves as a stop to limit the extent of insertion of the restrictor into the nipple. This is illustrated in FIG. 7, for example.

From the foregoing, it should be apparent that using restrictors in accordance with the present invention provides a simple, yet highly effective solution to the problems associated with providing excess hose length simply to achieve uniform pressure at the widely dispersed distribution heads of the machine. Thus, a significant amount of unsightly clutter is avoided, while facilitating access to other components of the machine and reducing costs. Moreover, the restrictors need not be adjusted, are hidden from view, and are protected within the nipples 38.

Figure 2:
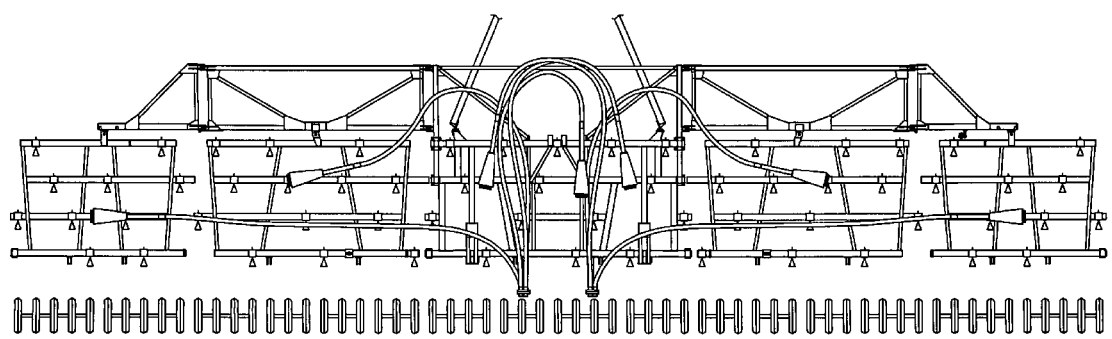
FIG. 2 is a fragmentary, schematic top plan view of a prior art machine in which the primary seed distribution hoses are all of the same length so as to maintain equal outlet pressures at the discharge ends of the hoses.

FIG. 2 shows a typical prior art machine wherein all of the primary supply hoses are of the same length in order to maintain uniform pressure at the distribution heads. Thus, all of the hoses in this machine, except for the two longest left and right hoses, are substantially longer than the corresponding hoses on implement 14 of the present invention.

The inventor hereby states his intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a pneumatic seeding machine, the improvement comprising:
    a mobile cart supporting a seed reservoir, a plurality of conduits, and a blower for producing airstreams within the conduits for conveying seeds from the reservoir toward a downstream point of delivery;
    a seed planting implement disposed for receiving seeds from said cart and placing them in the ground,
    said implement including
        at least a pair of supply hoses for delivering seeds entrained within airstreams in the hoses to a corresponding pair of distribution devices; and
        a coupling assembly detachably connecting said conduits of the cart with the implement in a manner to establish flow communication between the conduits and the hoses,
        at least one of said hoses being shorter than the other,
        said coupling assembly including a flow restrictor disposed to produce a pressure drop in the shorter hose to such an extent that the pressure in the hoses at said distribution devices is substantially equal notwithstanding the differences in length between the hoses.

2. In a seeding machine as claimed in claim 1,
    said implement further including a mobile frame,
    said coupling assembly including a support mounted on the frame and at least a pair of tubular nipples carried by said support,
    said hoses being connected to said nipples,
    said restrictor being located within the nipple to which the shorter hose is connected.

3. In a seeding machine as claimed in claim 2, said nipples being received within said hoses.

4. In a pneumatic seeding machine, the improvement comprising:
    a mobile cart supporting a seed reservoir, a plurality of conduits, and a blower for producing airstreams within the conduits for conveying seeds from the reservoir toward a downstream point of delivery;
    a seed planting implement disposed for receiving seeds from said cart and placing them in the ground,
    said implement including
        at least a pair of supply hoses for delivering seeds entrained within airstreams in the hoses to a corresponding pair of distribution devices; and
        a coupling assembly detachably connecting said conduits of the cart with the implement in a manner to establish flow communication between the conduits and the hoses,
        at least one of said hoses being shorter than the other,
        said coupling assembly including a flow restrictor disposed to produce a pressure drop in the shorter hose to such an extent that the pressure in the hoses at said distribution devices is substantially equal notwithstanding the differences in length between the hoses,
    said implement further including a mobile frame,
    said coupling assembly including a support mounted on the frame and at least a pair of tubular nipples carried by said support,
    said hoses being connected to said nipples,
    said restrictor being located within the nipple to which the shorter hose is connected,
    said nipples each having an internal diameter,
    said restrictor comprising an annular, cylindrical body having an internal throat that is of reduced diameter relative to the internal diameter of the nipple within which the restrictor is disposed.

5. In a seeding machine as claimed in claim 4,
    said body having an inlet on the upstream side of said throat that tapers toward the throat at a rate of convergence,
    said body having an outlet on the downstream side of said throat that progressively expands away from the throat at rate of expansion that is higher than said rate of convergence of the inlet.

6. In a pneumatic seeding machine, the improvement comprising:
    a mobile cart supporting a seed reservoir, a plurality of conduits, and a blower for producing airstreams within the conduits for conveying seeds from the reservoir toward a downstream point of delivery;
    a seed planting implement disposed for receiving seeds from said cart and placing them in the ground,
    said implement including
        at least a pair of supply hoses for delivering seeds entrained within airstreams in the hoses to a corresponding pair of distribution devices; and
        a coupling assembly detachably connecting said conduits of the cart with the implement in a manner to establish flow communication between the conduits and the hoses,
        at least one of said hoses being shorter than the other,
        said coupling assembly including a flow restrictor disposed to produce a pressure drop in the shorter hose to such an extent that the pressure in the hoses at said distribution devices is substantially equal notwithstanding the differences in length between the hoses,
    said implement further including a mobile frame,
    said coupling assembly including a support mounted on the frame and at least a pair of tubular nipples carried by said support,
    said hoses being connected to said nipples,
    said restrictor being located within the nipple to which the shorter hose is connected, said restrictor comprising an annular, cylindrical body having an enlarged external collar wedged into the nipple to retain the body within the nipple.

7. In a seeding machine as claimed in claim 6,
said body having a stop disposed to abut an end extremity of the nipple to limit insertion of the restrictor into the nipple.

8. In a seeding machine as claimed in claim 7,
said stop comprising a circumferentially continuous lip on the body having an outside diameter exceeding that of said collar.

9. In a pneumatic seeding machine, the improvement comprising:
  structure defining at least a pair of tubular airflow passages for delivering seeds entrained within airstreams to a corresponding pair of predetermined locations,
  at least one of said passages being shorter than the other and having an outside diameter and an inside diameter; and
  an internal, tubular flow restrictor within the shorter passage for producing a pressure drop in the shorter passage to such an extent that the pressure in the passages at said predetermined locations is substantially equal notwithstanding the differences in length between the passages,
  said internal flow restrictor effectively reducing the inside diameter of a portion of the shorter passage without reducing the outside diameter thereof.

10. In a seeding machine as claimed in claim 9,
said restrictor comprising an annular, cylindrical body having an enlarged external collar wedged into the passage to retain the restrictor.

11. In a pneumatic seeding machine, the improvement comprising:
  structure defining at least a pair of tubular airflow passages for delivering seeds entrained within airstreams to a corresponding pair of predetermined locations,
  at least one of said passages being shorter than the other; and
  an internal, tubular flow restrictor within the shorter passage for producing a pressure drop in the shorter passage to such an extent that the pressure in the passages at said predetermined locations is substantially equal notwithstanding the differences in length between the passages,
  said restrictor comprising an annular, cylindrical body having an internal, constant diameter throat, an inlet on the upstream side of the throat tapering toward a reduced dimension at the throat, and an outlet on the downstream side of the throat that progressively expands away from the throat.

12. In a seeding machine as claimed in claim 11,
the rate of expansion of the outlet being greater than the rate of convergence of the inlet.

13. In a pneumatic seeding machine, the improvement comprising:
  structure defining at least a pair of tubular airflow passages for delivering seeds entrained within airstreams to a corresponding pair of predetermined locations,
  at least one of said passages being shorter than the other; and
  an internal, tubular flow restrictor within the shorter passage for producing a pressure drop in the shorter passage to such an extent that the pressure in the passages at said predetermined locations is substantially equal notwithstanding the differences in length between the passages,
  said restrictor comprising an annular, cylindrical body having an internal, constant diameter throat, an inlet on the upstream side of the throat tapering toward a reduced dimension at the throat, and an outlet on the downstream side of the throat that progressively expands away from the throat,
  the rate of expansion of the outlet being greater than the rate of convergence of the inlet, said body having an enlarged external collar wedged into the passage to retain the restrictor.

14. In a seeding machine as claimed in claim 13,
said body further having a continuous, circumferentially extending lip adjacent said collar in downstream relation thereto,
said lip having an outside diameter exceeding that of said collar.

15. In a pneumatic seeding machine, the improvement comprising:
  structure defining at least a pair of tubular airflow passages for delivering seeds entrained within airstreams to a corresponding pair of predetermined locations,
  at least one of said passages being shorter than the other; and
  an internal, tubular flow restrictor within the shorter passage for producing a pressure drop in the shorter passage to such an extent that the pressure in the passages at said predetermined locations is substantially equal notwithstanding the differences in length between the passages,
  said restrictor comprising an annular, cylindrical body having an enlarged external collar wedged into the passage to retain the restrictor,
  said body further having a continuous, circumferentially extending lip adjacent said collar in downstream relation thereto,
  said lip having an outside diameter exceeding that of said collar.

* * * * *